Dec. 23, 1969
J. B. COLLINS
3,485,099
APPARATUS RESPONSIVE TO FLUID FLOW
Filed Oct. 24, 1967
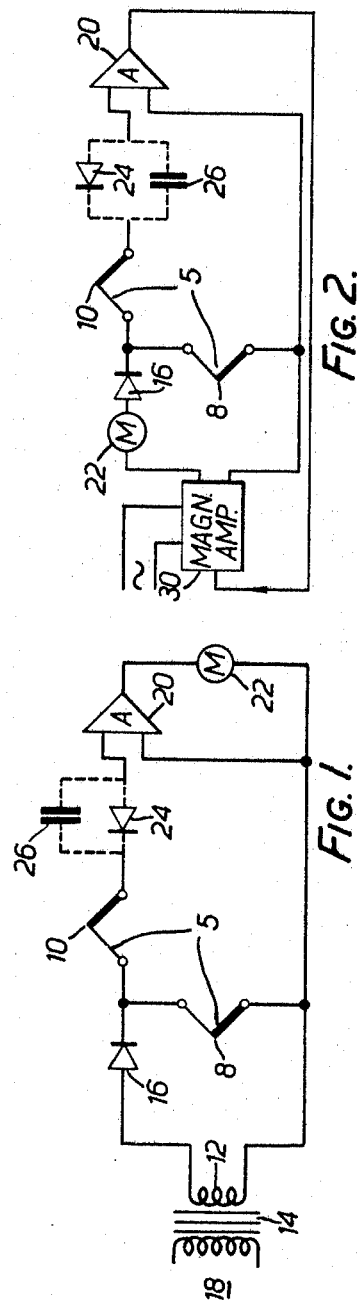
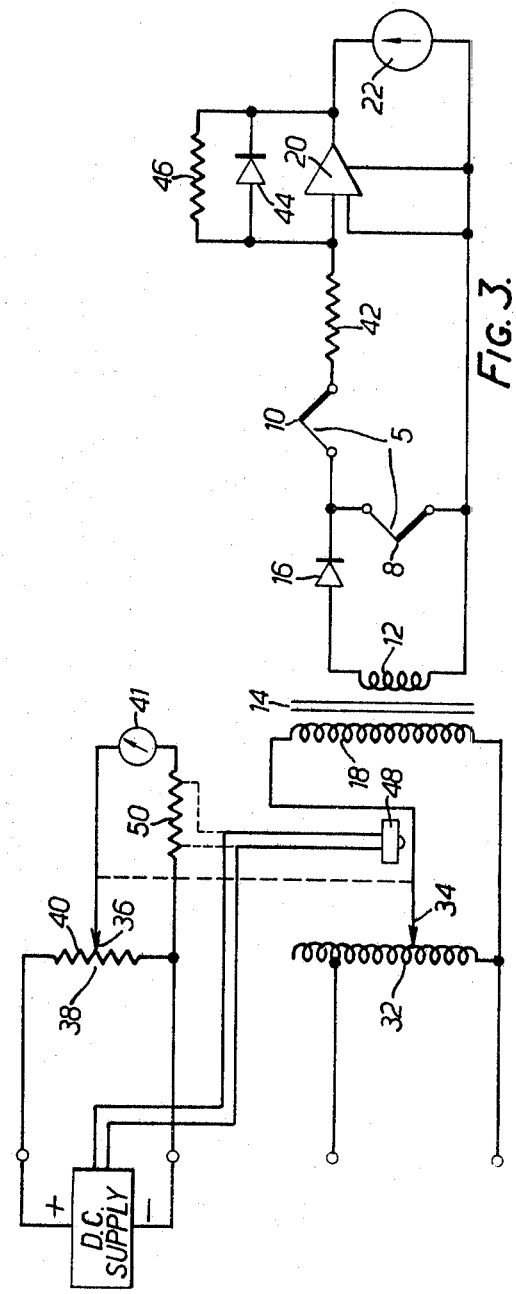
INVENTOR
JACK BERTRAM COLLINS
BY
ATTORNEYS United States Patent Office 3,485,099
Patented Dec. 23, 1969

3,485,099
APPARATUS RESPONSIVE TO FLUID FLOW
Jack Bertram Collins, Isleworth, Middlesex, England, assignor to Graviner (Colnbrook) Limited, London, England, a British company
Filed Oct. 24, 1967, Ser. No. 677,657
Claims priority, application Great Britain, Nov. 2, 1966, 49,123/66; May 13, 1967, 22,271/67
Int. Cl. G01f 1/00
U.S. Cl. 73—204                                 20 Claims

ABSTRACT OF THE DISCLOSURE

Fluid-flow responsive apparatus comprises a thermocouple having both its junctions in the fluid, and means for periodically heating one only of the junctions. An output circuit responds to the thermocouple E.M.F. produced between the heating periods, this thermocouple E.M.F. being dependent on the rate of loss of the heat input to the heated junction and thus dependent on the rate of flow of fluid.

---

The invention relates to apparatus responsive to fluid flow.

According to the invention, there is provided fluid-flow responsive apparatus, including transducing means operative to produce an electrical output in dependence on its temperature, heating means for periodically heating the transducing means, and output means responsive to the electrical output of the transducing means between the heating periods to produce an electrical signal representing the rate of loss of the heat input, whereby the said signal is dependent on the rate of fluid flow when the transducing means is in heat-exchanging relationship with the fluid.

According to the invention, there is also provided fluid-flow responsive apparatus, comprising a pair of thermocouple junctions, heating means for periodically heating one only of the junctions, and output means operative in response to the thermocouple E.M.F. produced by the two junctions between the heating periods for producing an electrical output signal, whereby the said output signal is dependent on the fluid flow when the said one junction is in heat exchanging relationship with the fluid.

Fluid flow arrangements embodying the invention will now be described by way of example and with reference to the accompanying drawings in which:

FIGURE 1 is a schematic circuit diagram of one of the arrangements;

FIGURE 2 is a schematic circuit diagram of another of the arrangements, operating on the closed loop principle; and FIGURE 3 is a schematic circuit diagram of a further one of the arrangements.

FIGURE 1 shows a thermocouple 5 whose hot and cold junctions 8 and 10 respectively are both located in the path of the fluid whose flow rate is to be measured. The hot junction 8 is connected to the secondary winding 12 of a transformer 14 through a rectifier 16 whereby a current is passed through the hot junction during alternate half cycles of a substantially stable alternating current power supply connected to the primary winding 18 of the transformer.

The thermocouple 5 is connected to feed the input of an amplifier 20 whose output is measured on a meter 22. A further rectifier 24 is connected in series with the cold junction 10.

In operation, the electrical resistance of the hot junction 8 is such that it is heated during each alternate half cycle of the alternating current power supply by the current supplied through the rectifier 16, the rectifier 24 preventing any current from passing through the cold junction 10 during these alternate half cycles, thus preventing any electrical heating of the cold junction 10, and also preventing the alternate half cycles from affecting the amplifier 20.

During the intervening half cycles, the rectifier 16 prevents the supply from driving a current through either junction of the thermocouple. However, by virtue of normal thermocouple action, a small E.M.F., dependent on the difference in temperature between the hot junction 8 and the cold junction 10, is produced during these intervening half cycles, which is applied to the amplifier 20. Therefore, the reading of the meter 22 is an indication of the temperature difference between the hot and cold junctions 8 and 10 of the thermocouple, and is thus a measure of the rate of loss of the heat supplied to the hot junction 8 during the electrical energisation thereof by the supply: this rate of heat loss is dependent on the rate of flow of the fluid over the hot junction 8. Thus the indication of the meter 22 is representative of the rate of flow of the fluid.

As shown dotted in FIGURE 1, the blocking rectifier 24 may be replaced by a capacitor 26, and provision may be made in the amplifier to produce, during each alternate half cycle of the supply which drives the current through rectifier 16, a balancing signal which prevents the amplifier being affected by the supply and also prevents current passing through the cold junction 10.

In FIGURE 2 parts similar to parts in FIGURE 1 are similarly referenced. In FIGURE 2, the alternating current power supply is connected to the input of a magnetic amplifier 30 which produces an alternating output dependent on the value of a control signal derived from the output of the amplifier 20, the output of the magnetic amplifier 30 being connected to supply the hot junction 8 through the rectifier 16. The meter 22 is connected in series with the output of the magnetic amplifier 30.

As explained in connection with FIGURE 1, the output of the amplifier 20 is dependent on the rate of heat loss from the hot junction 8 (and thus on the rate of flow of the fluid). If, therefore, the flow rate changes, the consequent change in rate of heat loss from the hot junction 8 will produce a proportionate change in the value of the control signal from the amplifier 20. This change in the value of the control signal causes the magnetic amplifier 30 to adjust the power supplied to the hot junction 8, during the alternate half cycles of the supply, to compensate for the change in the rate of heat loss and to tend to maintain the hot junction 8 at a constant temperature relative to the cold junction. Thus, the current supplied to the hot junction 8 during the alternate half cycles is a measure of the rate of heat loss from the hot junction and is indicated as a rate of flow on the meter 22.

In FIGURE 3, parts similar to parts in FIGURES 1 and 2 are similarly referenced. The primary winding 18 of the transformer 14 is supplied by means of an adjustable auto-transformer 32 having a slider 34 and which is connected to an alternating voltage supplied such as, for example, at 240 volts and 50 cycles per second.

The rotatable spindle of the auto-transformer 32 carrying the slider 34 is mechanically linked to a slider 36 forming part of a potential divider 38 whose winding 40 is wound with a square-law characteristic and is supplied with a stable D.C. voltage such as, for example, 30 volts. The slider 36 of the potential divider 38 feeds a volt meter 41 whose scale is calibrated in flow rate.

The thermocouple 5 is connected to feed the amplifier 20 through a resistor 42. A further rectifier 44, and a resistor 46, are connected in parallel with each other and between the input and output of the amplifier.

In operation, the hot junction 8 is heated during each alternate half cycle of the secondary voltage developed across the winding 12 by the current supplied through the rectifier 16, the current depending on the setting of the slider 34. During these alternate half cycles, the rectifier 44 prevents the amplifier 20 from producing any output: any output which the amplifier 20 tends to produce will be of negative polarity (because of phase reversal in the amplifier) and will be substantially completely fed back to the input of the amplifier through the rectifier 44 thus cutting off the amplifier and effectively preventing the voltage across winding 12 from passing any current through the cold junction 10.

During the intervening half cycles of the secondary voltage across the secondary winding 12, the rectifier 16 prevents the supply from driving a current through either junction of the thermocouple. However, the small thermocouple E.M.F. produced during these intervening half cycles is applied to the amplifier 20. The polarity of the thermocouple E.M.F. is such that the output of the amplifier 20 is of positive polarity so as to back-bias and cut off the rectifier 44: the resistor 46 provides normal negative feed back for stabilisation purposes. Therefore, the output of the amplifier 20 is dependent on the mean temperature difference between the hot and cold junctions 8 and 10 of the thermocouple during these intervening half cycles and is thus dependent on the rate of loss of the heat supplied to the hot junction 8 by the electrical energisation thereof during the alternate, heating, half cycles of the supply.

With no fluid flow over the thermocouple junctions, the slider 34 is manually set such that the secondary voltage developed across the winding 12 produces just sufficient heat input to the hot junction 8 during the alternate half cycles of the supply that the mean thermocouple E.M.F. produced during the intervening half cycles deflects the pointer of the instrument 21 to a central position on its scale which is marked as a null point. This setting of the slider 34 sets the slider 36 correspondingly and the scale of the instrument 41 is calibrated so that the resultant indication of the pointer thereof represents zero flow. Under zero flow conditions, the slider 34 will be very near one end of its range of travel so that the output voltage from the auto-transformer is very low.

If the flow of fluid over the junctions of the thermocouple 5 increases from zero, there will be an increased rate of loss of heat from the hot junction 8, and a corresponding decrease in the output from the amplifier 20 which will be indicated by appropriate movement of the pointer of the instrument 22. The operator therefore manually adjusts the slider 34 so as to increase the secondary voltage developed across the winding 12. The operator increases the secondary voltage until the increased heat input to the hot junction 8 during the alternate half cycles is sufficient to compensate for the increased heat loss resulting from the fluid flow over the junction 8, so as to re-establish the pointer of the instrument 22 at the null position. The adjustment of the slider 34 repositions the slider 36 correspondingly so as to apply a greater voltage to the voltmeter 41 whose pointer thus indicates the rate of flow.

The use of a potential divider 38 having a winding with a square-law characteristic enables the fluid flow scale on the voltmeter 41 to be substantially linear. The transformer 14 serves to step down the output voltage of the auto-transformer 32 to a level suitable for application to the thermocouple 5 but could be omitted if, for example, the input voltage to the auto-transformer was such that its output voltage was suitable for the thermocouple.

The slider 36 of the potential divider 38 may be driven from the auto-transformer 32 in any suitable manner. If, for example, the potential divider 38 has a spindle which is rotated to drive the slider 34, then this spindle and the spindle of the auto-transformer can be geared by pinions to the same rack.

If the range of fluid flow rate to be measured by the arrangement is too high to be accurately indicated on the same scale of the voltmeter 41, then two or more scales can be printed on the same scale plate of the voltmeter each corresponding to a particular part of the range of flow to be indicated, and the input D.C. voltage across the winding 40 can be adjusted to suit each scale. This adjustment of the D.C. voltage can be carried out automatically in dependence on the position of the slider 31 if desired.

For example, a microswitch 48 can be mounted so as to be actuated by a cam attached to the spindle of the auto-transformer 30 when a particular position of the slider 31 is reached, so as to switch the D.C. voltage across the winding 40 from one value to the next. Therefore, for an initial part of the range of travel of the slider 34 (corresponding to low rates of flow), a relatively high D.C. voltage would be applied across the winding 40 so as to produce relatively large deflections of the pointer of the voltmeter 41. When the flow rate increases to such an extent that the pointer of the voltmeter 41 is fully deflected, the microswitch 48 operates to reduce the D.C. voltage across the winding 40 by, say, a factor of ten so as to render the voltmeter less sensitive: rates of flow would then be indicated on a different scale having a conciderably higher maximum value. The microswitch could be arranged to have two sets of contacts, one for selecting the D.C. voltage for the winding 40 and the other for indicating by means of lamps, for example, the operative scale of the voltmeter at any time.

Instead of altering the voltage across winding 40 to suit the different scales of the voltmeter 41, the voltage can be left constant and the sensitivity of the voltmeter can be altered changing the value of a resistor 50 in series with the voltmeter: this change in resistance can be carried out automatically by the microswitch 48.

Any other suitable arrangement may be used instead of the potential divider 38 and the voltmeter 41 to indicate the position of the slider 34 in terms of fluid flow. In a modification of the arrangement illustrated, the rotatable shaft of the auto-transformer is arranged to drive a cam. The cam has a follower arranged to provide linear movement of a rack engaging a pininon which drives a counter. The cam has a square-law characteristic and the counter is linearly calibrated to indicate flow rate.

For increased setting accuracy, the spindle of the auto-transformer 32 can be arranged to be rotated through step-down gearing.

The auto-transformer 32 is arranged with spring biasing or the like (which may operate under the control of damping means) to return the slider 34 to the low voltage end of its travel in between readings. Without such automatic return, it would be possible for the auto-transformer 34 to be set to produce a relatively high output voltage when the circuitry was connected up to a thermocouple 5 subjected to little or no flow. The resultant heat input into the thermocouple 5 could result in damage thereto.

In all the embodiments described, the cold junction 10 is sufficiently displaced from the hot junction 8 so as not to be affected by the electrical heating thereof.

Any change in the ambient temperature of the fluid will affect both junctions 8 and 10 of the thermocouple similarly and will not, therefore, affect the operation of the circuits described.

In any of the arrangements illustrated, the thermocouple may be mounted in a probe arranged, for example, to project through the wall of a pipe carrying the fluid, the hot and cold junctions 8 and 10 both being disposed in the portion of the probe projecting into the pipe but being sufficiently separated so that the cold junction 10 is not affected by the electrical heating of the hot junction 8. The probe may be in the form of a tube which is perforated to allow free flow of fluid around the thermocouple hot junction.

Instead of using a single thermcouple 5, two separate thermocouples with a common cold junction may be used, the hot junction 8 of one thermocouple being electrically heated as described and the other hot junction taking the place of the cold junction 10 and, like the cold junction 10, being located in the fluid but not affected by the electrical heating of the hot junction 8.

In a particular application, the arrangements described may be used to detect and indicate the rate of leakage of hydraulic fluid in an aircraft hydraulic system, such leakage being that which takes place past operating pistons and the like in the hydraulic system and which is indicated by abnormal fluid flow in the pipes of the system. Several thermocouples 5 can be built into the aircraft hydraulic fluid system, each being positioned at a particular point where leakage is to be detected and each having its connections brought out to accessible terminals. The remainder of the circuitry illustrated and described is arranged to be portable so that it can be plugged into each of the thermocouples in turn and adjusted in the manner described to indicate the rate of leakage flow. Instead of being portable, the remainder of the circuitry could be built into the aircraft and arranged to be switched to each of the thermocouples 5 in turn.

The thermocouple 5 may be replaced by some other suitable transducing means producing an electrical output when heated.

I claim:
1. Fluid-flow responsive apparatus, comprising
    transducing means operative to produce an electrical output in dependence on its temperature and positioned in heat-exchanging relationship with the said fluid,
    heating means for periodically heating the transducing means, and
    output means responsive to the electrical output of the transducing means between the heating periods to produce an electrical output signal representing the rate of loss of heat input, whereby the said output signal is dependent on the rate of fluid-flow.
2. Apparatus according to claim 1, in which the said output means includes an indicating instrument connected to indicate the mean value of the said electrical signal.
3. Apparatus according to claim 1, in which the said heating means includes
    control means for adjustably altering the heat input to the transducing means during the said heating periods and
    indicating means connected to the control means for indicating the amount of said heat input when the mean value of the said electrical output signal has a predetermined value whereby the indication of the indicating arrangement is dependent on the said rate of loss of the heat input.
4. Apparatus according to claim 1, in which the transducing means includes one junction of a thermocouple.
5. Apparatus according to claim 4, in which the heating means includes circuit means for periodically passing an electrical current through the said one junction for resistively heating the junction.
6. Fluid-flow responsive apparatus, comprising
    a pair of thermocouple junctions at least one of which is positioned in heat-exchanging relationship with said fluid,
    heating means for periodically heating only the said one of the junctions, and
    electrical output circuit means connected to respond to the thermocouple E.M.F. produced by the two junctions between the heating periods for producing an electrical output signal dependent on the rate of loss of heat input to the said one junction and thereby dependent on the fluid-flow.
7. Apparatus according to claim 6, in which the output means includes indicating means connected to indicate the mean value of the said electrical output signal whereby to indicate the rate of fluid-flow.
8. Apparatus according to claim 6, in which the said heating means includes
    an input circuit connected in parallel with the two said junctions,
    an alternating current power supply connected to energise the input circuit, and
    first unidirectional conducting means connected in the input circuit whereby to allow a heating electrical current to pass through the said one junction during alternate half-cycles of the supply which constitute the said heating periods.
9. Apparatus according to claim 8, in which the output means includes amplifying means connected in series with the two junctions so as to be responsive to the said thermocouple E.M.F.
10. Apparatus according to claim 9, including second unidirectional conducting means connected in series with the said other junction and in parallel with the said input circuit and so polarised with respect to the said first unidirectional conducting means as to prevent the amplifying means producing an output during the said heating period and to prevent current from the said supply passing through the said other junction.
11. Apparatus according to claim 9, including second unidirectional conducting means connected between the input and output of the amplifying means and so polarised with respect to the said first unidirectional conducting means as to prevent the amplifying means producing an output during the said heating period.
12. Apparatus according to claim 8, including servo means for controlling the magnitude of the heating electrical current applied to the said one junction, the servo means being connected to respond to the said electrical output signal whereby to adjust the heating electrical current in such a direction as tends to maintain the output signal at a predetermined value, and including indicating means connected to measure the heating electrical current whereby to indicate the fluid-flow rate.
13. Apparatus according to claim 8, including manually controllable means connected to adjust the value of the heating electrical current supplied to the said one junction, and indicating means for indicating the setting of the manually controllable means when the output signal has a predetermined value whereby to indicate the fluid-flow rate.
14. Apparatus according to claim 13, including a first electrical indicator connected to indicate the value of the said electrical output signal, and in which the said indicating means comprises a second electrical indicator, adjustable energising means connected to electrically energise the second electrical indicator, and means mechanically linking the adjustable energising means and the manually controllable means whereby the indication of the second indicator is dependent on the setting of the manually controllable means and is representative of the fluid-flow rate when the indication of the first electrical indicator has a predetermined value.
15. Apparatus according to claim 14, in which the adjustable energising means comprises
    a resistor,
    a stabilised power supply connected to energise the said resistor,
    a slider contact movable over and in electrical contact with the resistor, the slider contact being mechanically connected to be positioned in dependence on the setting of the manually controllable means, and
    means electrically connecting the second electrical indicator to be responsive to the potential of the slider contact.
16. Apparatus according to claim 15, in which the resistance of the said resistor is non-linear over its length whereby the electrical potential of the slider contact varies non-linearly with its movement over the resistor, the relationship between the electrical potential of the slider contact and the movement thereof being such that the indication of the said second indicator when the indication of the first indicator has a predetermined value varies linearly with fluid-flow rate.

17. Apparatus according to claim 16, in which the said indicating means comprises mechanical indicating means mechanically linked to the manually controllable means whereby to be set according to the setting of the manually controllabe means and thereby to indicate the fluid-flow rate when the said output signal has the said predetermined value.

18. Apparatus according to claim 13, in which the manually controllable means comprises an adjustable auto-transformer.

19. Apparatus according to claim 6 for detecting abnormal flow in a hydraulic system, including means mounting one thermocouple junction in an area where abnormal flow of hydraulic fluid may take place.

20. Apparatus according to claim 19, including connecting means for releasably connecting the thermocouple junctions to the remainder of the apparatus.

References Cited
UNITED STATES PATENTS 2,669,872    2/1954    Hartweg _____ 73—204 XR JAMES J. GILL, Primary Examiner